US010071576B2

(12) United States Patent
Dunga

(10) Patent No.: US 10,071,576 B2
(45) Date of Patent: Sep. 11, 2018

(54) ROLL TO ROLL PRINTING METHOD

(71) Applicant: Océ Holding B.V., Venlo (NL)

(72) Inventor: Claudiu Dunga, Timisoara (RO)

(73) Assignee: OCÉ HOLDING B.V., Venlo (NL)

(*) Notice: Subject to any disclaimer, the term of this patent is extended or adjusted under 35 U.S.C. 154(b) by 0 days.

(21) Appl. No.: 15/593,550

(22) Filed: May 12, 2017

(65) Prior Publication Data

US 2017/0334225 A1 Nov. 23, 2017

(30) Foreign Application Priority Data

May 20, 2016 (EP) .................... 16170648

(51) Int. Cl.
B41J 15/16 (2006.01)
B41J 13/00 (2006.01)
G06F 3/12 (2006.01)

(52) U.S. Cl.
CPC .......... *B41J 15/16* (2013.01); *B41J 13/0009* (2013.01); *G06F 3/1204* (2013.01); *G06F 3/1256* (2013.01); *G06F 3/1282* (2013.01)

(58) Field of Classification Search
CPC ........ B41J 13/009; B41J 15/16; G06F 3/048; G06F 3/1205; G06F 3/1207; G06F 3/1251; G06F 3/1263; G06F 3/1285; G06K 15/022; G06K 2215/0097; G06K 2215/101

See application file for complete search history.

(56) References Cited

U.S. PATENT DOCUMENTS

| 7,260,587 | B2 * | 8/2007 | Testa .................. G06F 17/30265 |
| 7,379,047 | B2 * | 5/2008 | Drucker .................. G06F 3/017 345/156 |
| 7,729,004 | B2 * | 6/2010 | Currans .................. B41F 33/00 101/483 |
| 8,315,463 | B2 * | 11/2012 | Gallagher .......... G06K 9/00288 382/190 |
| 9,171,389 | B2 | 10/2015 | Roumier et al. |
| 9,704,078 | B2 * | 7/2017 | Kikumoto .......... G06K 15/1868 |
| 2007/0022892 | A1 | 2/2007 | Currans et al. |
| 2010/0149212 | A1 * | 6/2010 | Fukuya ............. G06F 17/30241 345/629 |

FOREIGN PATENT DOCUMENTS

EP 1 530 082 A1 5/2005

* cited by examiner

Primary Examiner — Anh T. N. Vo
(74) Attorney, Agent, or Firm — Birch, Stewart, Kolasch & Birch, LLP

(57) ABSTRACT

A roll to roll printing method in which a web of a recording medium is withdrawn from a first roll, a number of images are printed on the web and the printed web is wound on a second roll, wherein a representation of the printed images is printed on a part of the web which is to form a trailing end of the web on the second roll.

11 Claims, 2 Drawing Sheets

ROLL TO ROLL PRINTING METHOD

The present invention relates to a roll to roll printing method in which a web of a recording medium is withdrawn from a first roll, a number of images are printed on the web, and the printed web is wound on a second roll.

U.S. Pat. No. 9,171,389 B2 describes a method of this type, wherein, in order to facilitate the planning of print jobs, a composed digital image is constructed which represents the roll and comprises a plurality of representations of the individual digital images to be printed.

It is an object of the present invention to facilitate a post-processing of the printed images.

In order to achieve this object, according to the present invention, a representation of the printed images is printed on a part of the web which is to form a trailing end of the web on the second roll.

The representation of the printed images will be visible at the outer periphery of the second roll when the web has been wound completely on that roll. Thus, the printed contents of the roll can readily be inferred from the representation printed on the end of the web without having to refer to any digital display. This facilitates post-processing operations such as cutting the web, sorting or collating the images, distributing the images to their respective destinations, and/or other finishing operations. Especially in cases where the printing and post-processing operations are carried out by different operators and/or at different locations, it is a great advantage that the image content of a roll is readily available on the roll itself.

More specific optional features of the present invention are indicated in the dependent claims.

In one embodiment, the representation of the printed images may take the form of a banner showing a scaled version of the entire web wherein the shapes and positions of the individual printed images are indicated by respective place holders. The banner may for example extend over the entire width of the web in parallel with the trailing edge of the web. Optionally, the banner may be divided into several segments that are printed in several parallel stripes, which permits to represent the individual images on a larger scale.

The place holders of the images may bear certain printed features such as different colors, patterns, tags or labels, which permits to classify the printed images in accordance with the print jobs to which they belong, job owners, finishing options and the like. The printed features may also comprise a code tag such as a bar code or QR code linking each printed image or class of images to a corresponding job ticket which may be printed with a separate small format printer.

The invention also relates to a non-transitory software product comprising program code on a machine readable medium, which program code, when loaded in a controller of a printer according to the present invention, causes the printer to perform the method according to the present invention.

Embodiment examples will now be described in conjunction with the drawings, wherein.

Figure 1:
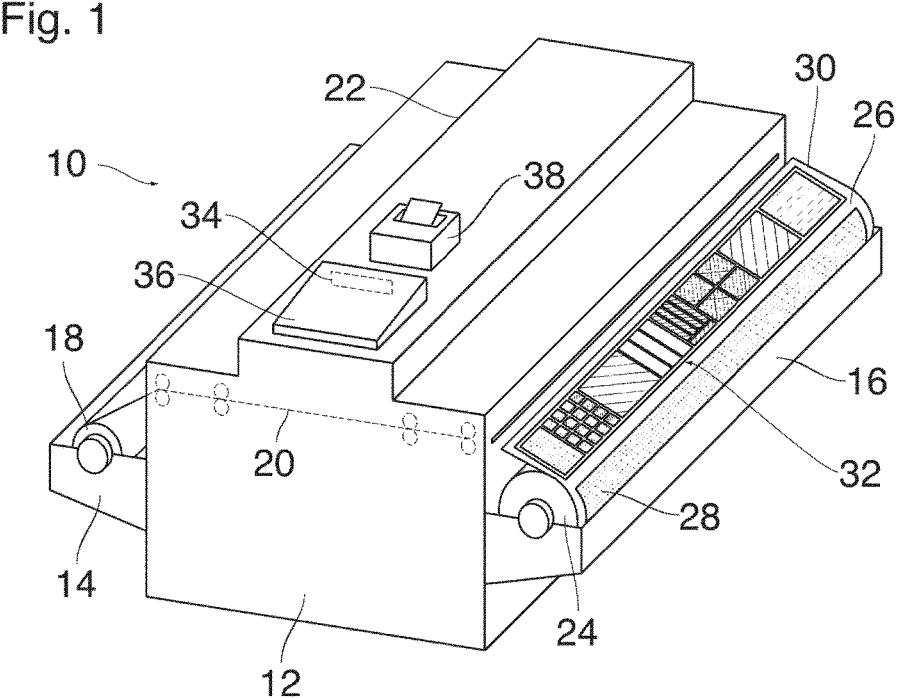
FIG. 1 is a schematic perspective view of a roll to roll printer which may be used for practicing the present invention.

As is shown in FIG. 1, a roll to roll printer 10, e.g. an ink jet printer, has a body 12 with first and second roll supports 14 and 16 projecting from opposite sides of the body. A first roll 18 is rotatably supported in the first roll support 14, and a recording medium in the form of an endless web 20 may be withdrawn from the first roll 18 and passed through the body 12 of the printer.

A print head 22 extends across the entire width of the web 20 and is arranged to print images on a top surface of the web 20 while the web is advanced through the body 12.

The web with the images printed thereon is passed-on towards a second roll 24 which is rotatably supported on the second roll support 16. Thus, the printed web may be wound on the roll 24.

Optionally, the printer may have an integrated cutter for cutting the web 20 into sections of suitable length.

In the example shown in FIG. 1, the web 20 which is withdrawn from the first roll 18 has just been fed into the body 12 whereas another web 26 on which images 28 have been printed already has been wound almost completely on the second roll 24, with a trailing end portion 30 of the web 26 just leaving the body 12.

As is shown in FIG. 1, a summary or representation 32 of all the images 28 that have been printed onto the web 26 has been printed on the trailing end portion 30 of the web. Thus, an operator who wants to remove the roll 24 from the roll support 16 in order to subject the web 26 and the images 28 printed thereon to some post-processing can see at a glance what kind of images have been printed on that web. Of course, the representation 32 can be printed with the print head 22 that has also been used for printing the images 28.

As is further shown in FIG. 1, the printer 10 has an electronic controller 34 controlling the entire operation of the printer, and an operating panel 36 constituting a user interface of the printer.

Although not shown in the drawing, the controller 34 may be connected to a network for communication with a remote user interface and/or for receiving print jobs from remote locations.

When one or more print jobs are received, the controller 34 will schedule the print processing such that the images to be printed will be printed on the web at suitable positions so that the print area provided by the web is utilized optimally. When all the images have been printed (as on the web 26 in this example) and the trailing end portion 30 of the web passes underneath the print head 22, the controller 34 will control the print head to print the representation 32 in order to show the position and shape of each printed image as scheduled.

Further, a small-format job ticket printer 38 is provided on the body 12 of the printer 10 and may be used for printing job tickets for the various print jobs that have been processed or will be processed.

Figure 2:
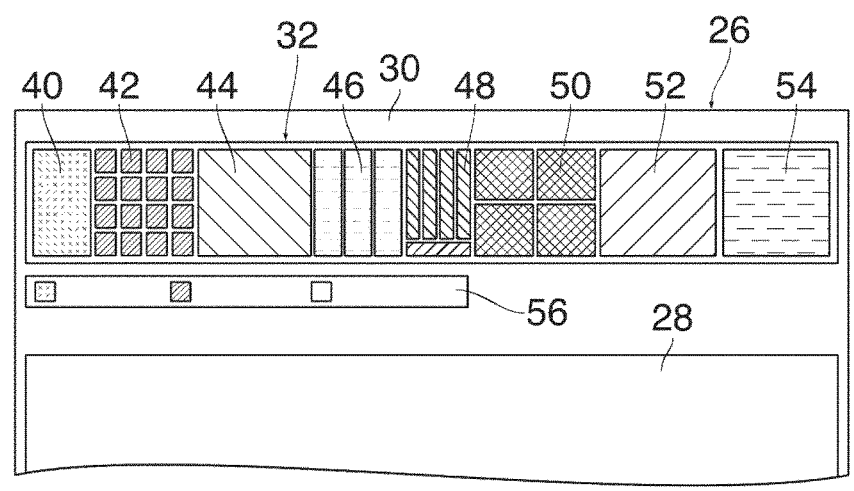
FIG. 2 is a view of an end portion of a printed web obtained by the method according to the present invention.

FIG. 2 is an enlarged view of the trailing end portion 30 of the web 26. It can be seen that the representation 32 of the printed images takes the form of a stripe-shaped banner that extends in parallel to the trailing edge of the web 26 across the entire width of the web. The length of the banner (from left to right in FIG. 2) represents the entire length of the web 26 wound on the roll 24, whereas the width or height of the banner in FIG. 2 represents the width of the web 26. Thus, the representation 32 can be considered as an image of the web 26 on a reduced scale. Within this banner, place holders 40-54 indicate the shapes and positions of all the images, such as the image 28, that have been printed on the web 26. In the given example, the left end of the stripe-shaped banner forming the representation 32 represents the trailing end of the web 26, so that the place holder 40 corresponds to the last image 28 on the web.

In the example shown, each of the place holders 40-54 has at least one printed feature, e.g. a color, which permits to classify the related images in accordance with suitable classification criteria. In the example shown, the place holders 40-54 have different colors or patterns, and each color is assigned to a different owner, i.e. a person who has submitted the print job that includes the respective image. A legend 56 showing which color has been assigned to which owner is also printed on the end portion 30 of the web.

Thus, in this example, the pattern or color of the place holder 40 indicates that the corresponding printed image 28 has been submitted by a person "owner 1", whereas another owner ("owner 2") has requested to print sixteen images in a smaller format as represented by the place holders 42.

In the example shown, the images owned by different owners have been grouped such that all images that belong to the same owner are located adjacent to one another on the web and, accordingly, the related place holders are also shown adjacent to one another. Depending upon the sequence in which the print jobs are submitted, and depending upon the shapes and dimensions of the images to be printed, it may however be more convenient to print images that belong to different owners or different print jobs at mixed positions on the web in order to more fully exploit the available area of the web. In that case, it will be particularly useful that the positions of each image are shown by the respective place holders.

Of course, the colors or patterns of the place holders may also stand for other classification criteria such as different destinations to which the printed images have to be delivered, different finishing options, and the like. It is also possible to have a hierarchical classification structure, e.g. with different jobs as main classes and different finishing options as sub-classes, and this classification structure may be represented by different colors and patterns, for example, of the place holders. Further, instead of or in addition to using different colors and patterns, the place holders may have other printed features such as labels or code-tags for identifying the images and/or their classes.

Figure 3:
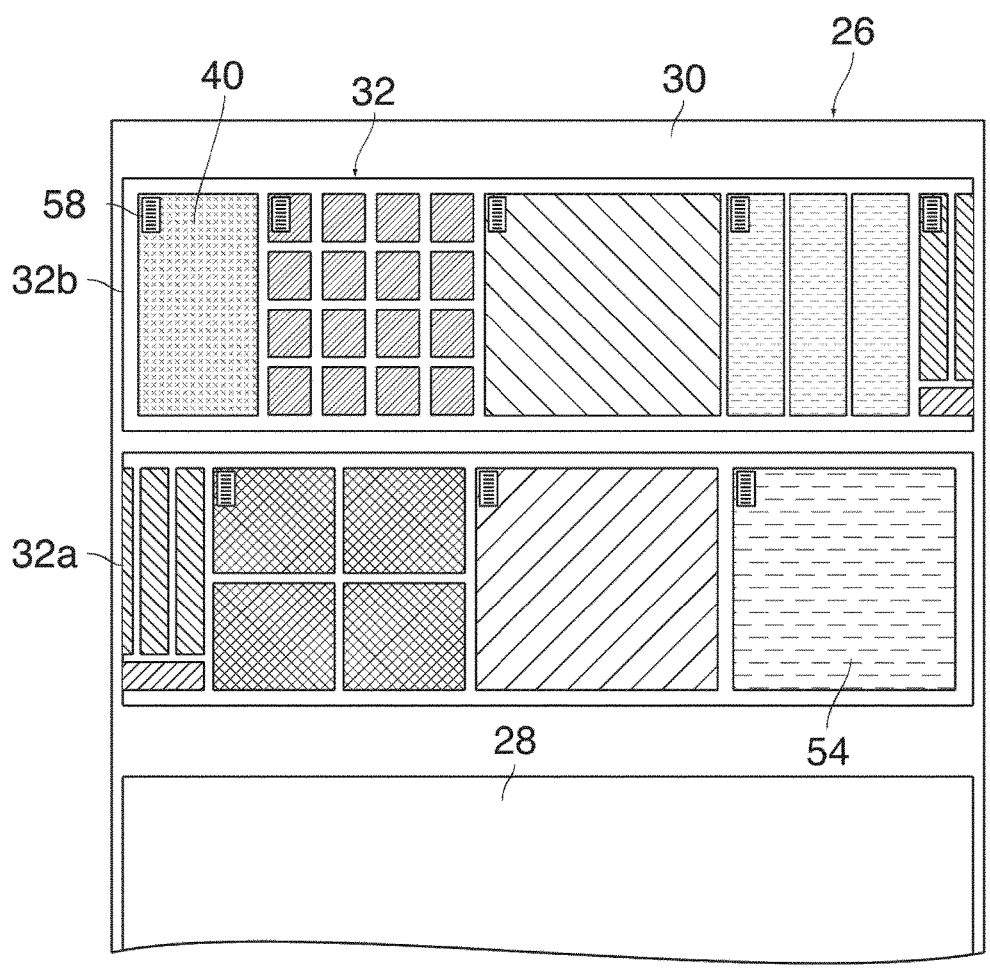
FIG. 3 is a view of an end portion of a printed web obtained by a method according to another embodiment.

While the representation 32 shown in FIG. 2 has the form of a single stripe extending over the width of the web 26, FIG. 3 illustrates an example where the representation 32 has been divided into two stripe-shaped segments 32a, 32b, which have been printed as two parallel stripes extending across the width of the web 26, with the segment 32a representing a leading half of the web and the segment 32b representing a trailing half. This permits to print the representation 32 on a scale which is twice as large as the scale used in FIG. 2.

Further, in the example shown in FIG. 3, each of the place holders has, as another printed feature, a label 58, e.g. a bar code label which may be used for identifying the related printed images and/or classes of images. In the example shown in FIG. 3, the different colors or patterns of the place holders stand for different print jobs, and a label 58 is provided for each print job and identifies a job ticket related to that print job. The job tickets may be printed with the job ticket printer 38 shown in FIG. 1 and each ticket may contain the same bar code as the bar code 58 on the corresponding place holder, so that the printed images on the web may easily be related to the corresponding job tickets by means of a bar code reader.

The invention claimed is:

1. A roll to roll printing method, comprising the steps of:
   withdrawing a web of a recording medium from a first roll;
   printing a number of images on the web; and
   winding the printed web on a second roll,
   wherein a representation of the printed images is printed on a part of the web which is to form a trailing end of the web on the second roll and the representation is printed as an image representing the printed web on a reduced scale.

2. The method according to claim 1, wherein a print head that is used for printing the images on the web is used also for printing the representation.

3. The method according to claim 1, wherein the representation takes the form of a stripe-shaped scaled image of the printed web with place holders indicating shapes and positions of individual printed images on the web.

4. The method according to claim 3, wherein the representation is configured as at least one stripe extending across the width of the web in parallel with a trailing edge of the web.

5. The method according to claim 4, wherein the representation is divided into segments which represent different segments of the web and are arranged in parallel to one another.

6. The method according to claim 1, wherein the representation comprises different printed features for indicating different classes of printed images.

7. The method according to claim 6, wherein the printed features comprise different colors and/or patterns.

8. The method according to claim 7, comprising a step of printing, adjacent to the representation, a legend which explains the meaning of the colors and/or patterns.

9. The method according to claim 6, wherein the printed features comprise different labels.

10. A roll to roll printer comprising:
    a print head;
    a first roll supplying a web to be fed past the print head;
    a second roll for winding the web on which images have been printed with the print head; and
    a controller controlling the print head,
    wherein the controller is configured to perform the method according to claim 1.

11. A non-transitory software product comprising program code on a machine readable medium, which program code, when loaded in a controller of a printer causes the printer to perform the method according to claim 1.

* * * * *